April 15, 1958     C. R. BRACKETT     2,830,729
BEVERAGE BOTTLE CONTAINER

Filed Nov. 25, 1955     2 Sheets-Sheet 1

INVENTOR.
Clifford R Brackett
BY
Charles L. Lovercheck
attorney

April 15, 1958  C. R. BRACKETT  2,830,729
BEVERAGE BOTTLE CONTAINER
Filed Nov. 25, 1955  2 Sheets-Sheet 2

INVENTOR.
Clifford R. Brackett
BY
Charles L. Lovercheck
attorney

United States Patent Office 2,830,729
Patented Apr. 15, 1958

2,830,729
BEVERAGE BOTTLE CONTAINER

Clifford R. Brackett, Erie, Pa.

Application November 25, 1955, Serial No. 548,846

3 Claims. (Cl. 220—21)

This invention relates to bottle carriers and more particularly to containers for carrying beverage bottles.

The present invention has for its primary object the provision of a beverage bottle case molded as an integral or unitary structure from a suitable plastic material with maximum rigidity while, at the same time, providing a sanitary structure for supporting beverage bottles.

Another object of the invention is to provide a molded plastic beverage bottle case which will allow cleaning by projecting water completely through the case whereby all foreign matter will be washed from the surfaces of the case.

A further object of the invention is to provide a bottle container which will allow free circulation of air around and between the bottles stored therein and therefore provides for rapid cooling of the bottles.

A still further object of this invention is to provide a beverage bottle container which is simple in construction, economical in manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
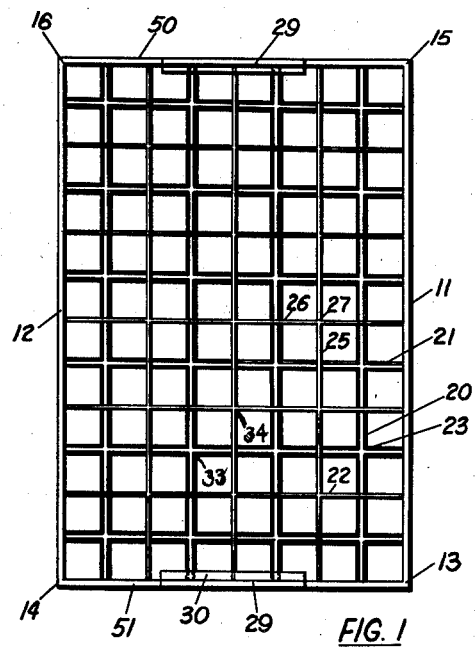
Fig. 1 is a top view of a beverage case according to the invention.
Figure 2:
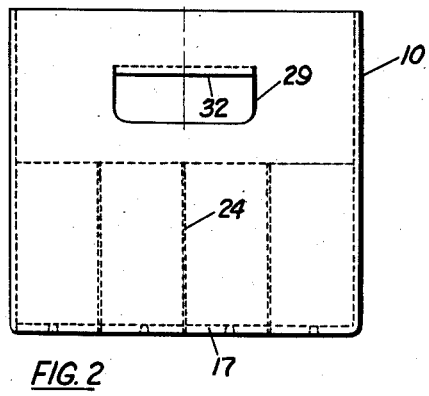
Fig. 2 is an end view of the case shown in Fig. 1.
Figure 4:
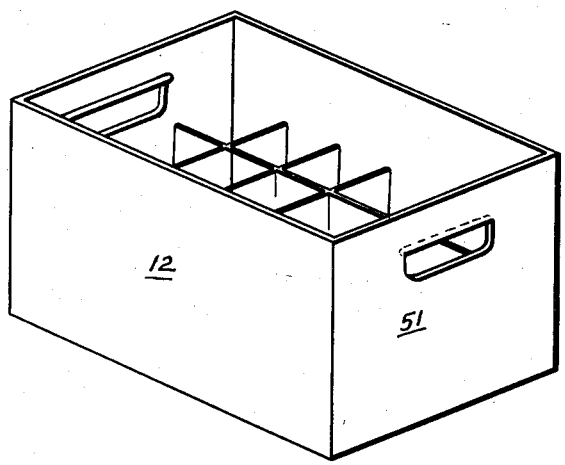
Fig. 4 is a top enlarged broken away view of the beverage case.
Figure 3:
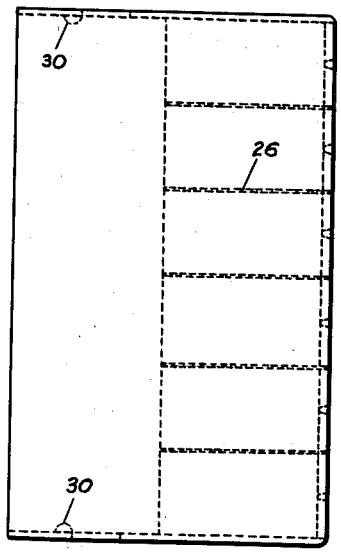
Fig. 3 is a side view of the beverage case.

Now with more specific reference to the drawings, a beverage case or container 10 is shown having sides 11 and 12 connected at the corners and made integral with ends 50 and 51 at 13, 14, 15, and 16. A bottom 17 is made of an open grill comprising longitudinally extending bars 20 and laterally extending bars 21 which intersect and are integral with the center of each compartment 22 at 23, thereby forming a cruciform support under each bottle supported in the container 10.

Partitions 24 are made up of longitudinally extending partition elements 25 and laterally extending partition elements 26 which are attached together integrally at their points of intersection at 27 and are molded integral with the transverse bars 20 and the laterally extending bars 21. The partition elements 25 and 26 form a supporting structure for the bottom bars 20 and 21 and the entire container 10 can be cleaned by running water therethrough with a hose or the like.

The bars 20 and 21 are generally wedge shaped in cross section with the wide section below to give additional tensile strength and foreign matter will slide off the narrow upper surface of the bars 20 and 21. Handle openings 29 are formed in each end of the container 10. A web 30 is formed just above an upper edge 32 of the handle openings 29 to form a comfortable engaging surface for the hand of the person lifting the case 10.

As shown in Fig. 1, where the partition members 25 intersect the partition members 26, fillets 33 are formed to strengthen the connection. Likewise, fillets 34 are formed at the junctions of the partition members 25 with the lateral bottom member 21. The entire case 10 can be made from a plastic material such as polyethylene or other plastic material having high strength and resistance to shock, thereby making the case 10 practical proof against damage in handling and the like.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A beverage bottle case having unitary side, end, and bottom walls, said end walls being provided in their upper central portion with rectilinear openings comprising handle elements with a bossed portion on the inside of said walls and at the edge of said rectilinear openings, longitudinal and lateral partition elements, said lateral partition elements being integrally attached to said side walls and said longitudinal partition elements being integrally attached to the end walls, said partition elements being integrally attached together at the intersection thereof, and longitudinally and laterally extending bar members integrally attached at their ends to the lower edge of said sides and said ends and integrally attached to said partition elements, said partition elements defining substantially square bottle receiving openings, said bar members intersecting at substantially the center of said bottle receiving openings and forming a support for bottles therein with open spaces between said bar members, said partition elements forming structural members to support said bar members and said bottles, said bar members forming structural members to support said bottles.

2. The case recited in claim 1 wherein said bar members are wedge shaped in cross section with the narrow edge thereof facing upward.

3. A beverage bottle case having unitary side, end, and bottom walls, longitudinally and laterally extending partition members, said laterally extending partition members being integrally attached to said side walls and said longitudinally extending partition members being integrally attached to said end walls, said partition members being integrally attached together at the intersection thereof, and longitudinally and laterally extending bar members integrally attached at their ends to the lower edge of said sides and said ends and integrally attached to said partition members, said partition members defining substantially square bottle receiving openings, said bar members intersecting at substantially the center of said bottle receiving openings and forming a support for bottles therein with open spaces between said bars, said partition members forming structural members to support said bars and said bottles.

References Cited in the file of this patent

UNITED STATES PATENTS

| | | |
|---|---|---|
| 2,025,769 | O'Dell | Dec. 31, 1935 |
| 2,411,673 | Vechey | Nov. 26, 1946 |
| 2,649,991 | Woock | Aug. 25, 1953 |

FOREIGN PATENTS

| | | |
|---|---|---|
| 476,768 | Great Britain | Dec. 15, 1937 |
| 583,519 | Great Britain | Dec. 20, 1946 |